US010207584B2

(12) United States Patent
Shiota et al.

(10) Patent No.: US 10,207,584 B2
(45) Date of Patent: Feb. 19, 2019

(54) INFORMATION PROVIDING APPARATUS FOR VEHICLE

(71) Applicant: Yazaki Corporation, Tokyo (JP)

(72) Inventors: Takashi Shiota, Shizuoka (JP); Yukio Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/673,199

(22) Filed: Aug. 9, 2017

(65) Prior Publication Data

US 2017/0334292 A1    Nov. 23, 2017

Related U.S. Application Data

(62) Division of application No. 15/185,954, filed on Jun. 17, 2016, now Pat. No. 9,815,371.

(30) Foreign Application Priority Data

Jun. 23, 2015    (JP) ................................. 2015-125306
Jun. 26, 2015    (JP) ................................. 2015-128341

(51) Int. Cl.
*B60K 35/00* (2006.01)
*G08G 1/16* (2006.01)
(Continued)

(52) U.S. Cl.
CPC .............. *B60K 35/00* (2013.01); *B60K 37/02* (2013.01); *G08G 1/166* (2013.01);
(Continued)

(58) Field of Classification Search
CPC ............ B60K 35/00; B60K 2350/1096; B60K 2350/901; G08G 1/166; G01S 13/86; G01S 13/931
(Continued)

(56) References Cited

U.S. PATENT DOCUMENTS 6,587,130 B1    7/2003    Amari et al.
8,514,825 B1 *  8/2013    Addepalli ............. H04W 4/046
                                                370/338
(Continued)

FOREIGN PATENT DOCUMENTS

JP    56-149232 A    11/1981
JP    57-174679 U1   11/1982
(Continued)

OTHER PUBLICATIONS

Japanese Office Action for the related Japanese Patent Application No. 2015-128341 dated Jun. 20, 2017.
(Continued)

*Primary Examiner* — John A Tweel, Jr.
(74) *Attorney, Agent, or Firm* — Kenealy Vaidya LLP (57) ABSTRACT

An information providing apparatus for a vehicle includes in-vehicle devices, a communication network connected to each of the in-vehicle devices, a storage portion in which a signal change pattern based on the condition of each of the in-vehicle devices is stored in associated state for each situation around the vehicle, a situation determining portion that determines the situation around the vehicle based on the signal change of at least one in-vehicle device and the stored signal change pattern, an information acquiring portion that acquires information on the condition of the in-vehicle device related to the determined situation around the vehicle, an information generating portion that generates notification information on a recommended operation based on the information on the condition of the related in-vehicle device, and an information presenting portion that presents the notification information on the recommended operation.

5 Claims, 8 Drawing Sheets

(51) Int. Cl.
*B60K 37/02* (2006.01)
*H04L 29/08* (2006.01)

(52) U.S. Cl.
CPC ............... *B60K 2350/1064* (2013.01); *B60K 2350/1096* (2013.01); *B60K 2350/901* (2013.01); *B60K 2350/903* (2013.01); *B60K 2350/962* (2013.01); *H04L 67/12* (2013.01)

(58) Field of Classification Search
USPC ........................................................ 340/439
See application file for complete search history.

(56) References Cited

U.S. PATENT DOCUMENTS

| | | | |
|---|---|---|---|
| 9,384,649 | B2 | 7/2016 | Kumai et al. |
| 9,469,248 | B2 | 10/2016 | Ng-Thow-Hing et al. |
| 9,815,371 | B2 * | 11/2017 | Shiota .................... B60K 35/00 |
| 2007/0273492 | A1 | 11/2007 | Hara et al. |
| 2008/0172154 | A1 | 7/2008 | Tanaka et al. |
| 2010/0222957 | A1 | 9/2010 | Ohta et al. |
| 2014/0203928 | A1 | 7/2014 | Takikawa et al. |
| 2015/0151689 | A1 | 6/2015 | Kimura et al. |

FOREIGN PATENT DOCUMENTS

| | | |
|---|---|---|
| JP | 58-76421 U1 | 5/1983 |
| JP | 1459-118616 U1 | 8/1984 |
| JP | 60-157885 U1 | 10/1985 |
| JP | 10-35415 A | 2/1998 |
| JP | 2004-017939 A | 1/2004 |
| JP | 2004-350137 A | 12/2004 |
| JP | 2007-230422 A | 9/2007 |
| JP | 2008-168786 A | 7/2008 |
| JP | 2009-120181 A | 6/2009 |
| JP | 2009-145270 A | 7/2009 |
| JP | 2010-76602 A | 4/2010 |
| JP | 2013-86553 A | 5/2013 |
| JP | 2014-21833 A | 2/2014 |
| JP | 2014-136553 A | 7/2014 |

OTHER PUBLICATIONS

Japanese Office Action for the related Japanese Patent Application No. 2015-128341 dated Jan. 16, 2018.
Japanese Office Action for the related Japanese Patent Application No. 2015-125306 dated Aug. 1, 2017.
Japanese Office Action for the related Japanese Patent Application No. 2015-125306 dated Oct. 17, 2017.
Japanese Office Action for the related Japanese Patent Application No. 2015-125306 dated May 16, 2017.

* cited by examiner

INFORMATION PROVIDING APPARATUS FOR VEHICLE

CROSS REFERENCE TO RELATED APPLICATIONS

This application is a divisional application claiming the priority benefit under 35 U.S.C. § 120 to co-pending and commonly assigned U.S. patent application Ser. No. 15/185,954 filed on Jun. 17, 2016, which claims the priority benefit under 35 U.S.C. § 119 of Japanese Patent Application No. 2015-125306 filed on Jun. 23, 2015 and published as JP2017007515A on Jan. 12, 2017, and Japanese Patent Application No. 2015-128341 filed on Jun. 26, 2015 and published as JP2017007619A on Jan. 12, 2017, the contents of all of which are incorporated herein by reference.

BACKGROUND OF THE INVENTION

1. Field of the Invention

The present invention relates to an information providing apparatus for a vehicle.

2. Description of the Related Art

Conventionally, of notifying apparatuses provided in vehicles, an apparatus is available that assists the driver with the driving operation by notifying the driver of the vehicle of various pieces of information. For example, an apparatus is available that, when the driver forgot to return the direction indicator lever, alerts him/her to the forgetting of returning the direction indicator lever (for example, see JP-A-2013-86553).

In this case, the notifying apparatus described in JP-A-2013-86553 provides an alert with attention only to what is directly related to the operation of the direction indicator lever itself.

However, the notifying apparatus described in JP-A-2013-86553 cannot present to the driver of the vehicle information on a recommended operation suitable for the situation around the vehicle.

Moreover, an information providing apparatus for a vehicle that provides various pieces of information to a passenger of the vehicle has conventionally been known. While the information providing apparatus for a vehicle provides information by request from a passenger, in recent years, a method has been known where from a viewpoint of convenience, even when there is no request from a passenger, a scene requiring information provision is determined on the apparatus side and information is automatically provided.

For example, JP-A-2009-145270 discloses a navigation apparatus that, when predetermined additional information is displayed on the display screen for navigation, causes a partial display area of the display screen to blink. According to this apparatus, the driver easily notices that the additional information is displayed.

For example, in JP-A-2010-76602, an in-vehicle device control apparatus that controls in-vehicle devices is disclosed. In this apparatus, when a message to ask whether to perform control of an in-vehicle device or not is read out, the passenger's action of vertically shaking his/her head while looking in a predetermined direction is detected as an affirmative reaction or the passenger's action of shaking his/her head from side to side while looking in a predetermined direction, as a negative reaction. When the affirmative reaction is detected, a control signal to perform the control related to the message is sent to the in-vehicle device.

However, even if an information provision scene is determined and the information is automatically provided, there are cases where the passenger side is not ready to receive the information. For this reason, there is a possibility that the information provision is felt to be annoying or felt to be meddling.

SUMMARY OF THE INVENTION

The present invention is made in view of such circumstances, and an object of the present invention is to provide an information providing apparatus for a vehicle capable of presenting to the driver of a vehicle information on a recommended operation suitable for the situation around the vehicle.

Moreover, another object of the present invention is to provide an information providing apparatus for a vehicle capable of providing information easy for a passenger to receive.

An information providing apparatus according to the present invention is an information providing apparatus provided in the vehicle and providing information to a driver driving the vehicle, the information providing apparatus comprising: a plurality of in-vehicle devices; a communication network connected to each of the plurality of in-vehicle devices; a storage portion that stores a signal change pattern based on a condition of each of the plurality of in-vehicle devices in associated state for each previously conceived situation around the vehicle; a situation determining portion that determines the situation around the vehicle based on a signal change in at least one in-vehicle device of the plurality of in-vehicle devices and the signal change pattern stored in the storage portion; an information acquiring portion that acquires, through the communication network, information on a condition of, of the plurality of in-vehicle devices, the in-vehicle device related to the situation around the vehicle determined by the situation determining portion; an information generating portion that generates notification information on a recommended operation recommended to the driver based on the information on the condition of the related in-vehicle device acquired by the information acquiring portion; and an information presenting portion that presents to the driver the notification information on the recommended operation generated by the information generating portion.

According to the information providing apparatus according to the present invention, since the information on the recommended operation is generated based on the situation around the vehicle and the condition of the in-vehicle device, information on the recommended operation suitable for the situation around the vehicle can be presented to the driver of the vehicle.

Moreover, in the information providing apparatus according to the present invention, for example, the condition of the related in-vehicle device is either recommended condition or non-recommended condition corresponding to the situation around the vehicle, and when the condition of the related in-vehicle device is the non-recommended condition, the information generating portion generates the notification information on the recommended operation.

According to this notifying apparatus, since it can be determined whether the condition of the in-vehicle device corresponding to the situation around the vehicle is the recommended condition or the non-recommended condition, notification information suitable for the situation around the vehicle can be generated.

Moreover, in the information providing apparatus according to the present invention, for example, when the signal change of at least one in-vehicle device of the plurality of in-vehicle devices and the signal change pattern coincide with each other, the situation determining portion selects, of the previously conceived situations around the vehicle, the situation around the vehicle corresponding to the coinciding signal change pattern as the determined situation around the vehicle.

According to this information providing apparatus, since the signal change of the in-vehicle device, the signal change pattern of the in-vehicle device and the situation around the vehicle can be associated with one another, the driver's current condition in the vehicle can be presumed.

According to the present invention, since the information on the recommended operation is generated based on the situation around the vehicle and the condition of the in-vehicle device, an information providing device can be provided that is capable of presenting to the driver of the vehicle the information on the recommended operation suitable for the situation around the vehicle.

Moreover, to solve the above-mentioned another problem, the present invention provides an information providing apparatus for a vehicle having: a situation determining portion that determines a current traveling situation based on a vehicle signal transmitted and received in the vehicle and a behavior model obtained by previously modeling a pattern of the vehicle signal for each traveling situation; a passenger condition determining portion that performs guiding control promoting a passenger's awareness by working on the passenger's sense and determines the passenger's condition in response to the guiding control; and a dialogue control portion that provides information to the passenger based on the current traveling situation determined by the situation determining portion and the passenger's condition determined by the passenger condition determining portion.

Here, in the present invention, for example, the dialogue control portion provides information to the passenger when it is determined that the passenger has become ready to receive information in a situation where the information should be provided.

Moreover, in the present invention, for example, the dialogue control portion determines a passenger's intention based on the passenger's response to the information provided to the passenger and outputs an operation command to operate a function mounted on the vehicle based on the determined passenger's intention.

Moreover, in the present invention, for example, the passenger condition determining portion recognizes at least one of a passenger's voice and a direction of the passenger's visual line and determines the passenger's condition in response to the guiding control based on a result of the recognition.

According to the present invention, by previously promoting the passenger's awareness, the readiness for the passenger to receive information can be created. And since information is provided to the passenger having become ready to receive it, the passenger does not readily feel that it is annoying or meddling, so that information provision easy for the passenger to receive can be performed.

DETAILED DESCRIPTION OF THE EXEMPLARY EMBODIMENTS (First Embodiment)

Figure 1:
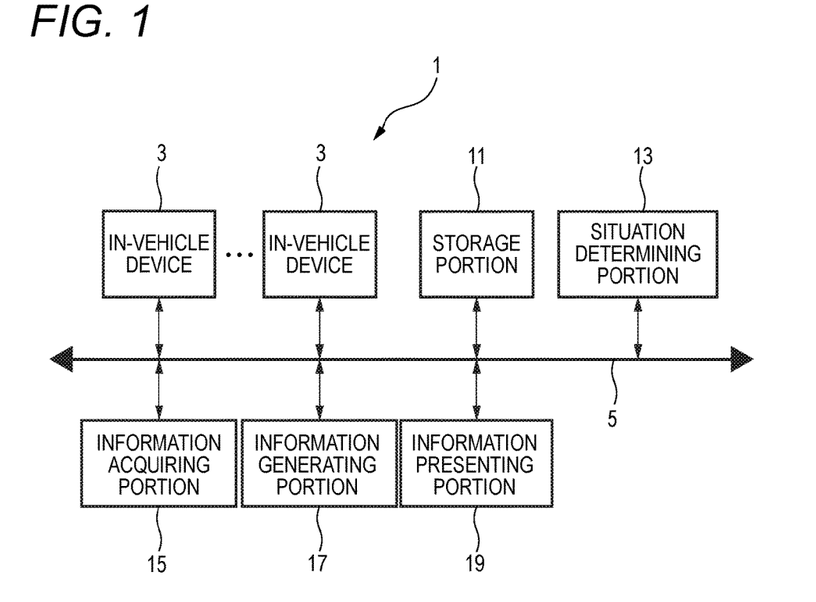
FIG. 1 is a view showing a schematic structure of an information providing apparatus according to a first embodiment.

FIG. 1 is a view showing a schematic structure of an information providing apparatus according to a first embodiment. As shown in FIG. 1, an electronic apparatus 1 includes the information providing apparatus, and is provided in a vehicle. The electronic apparatus 1 is provided with a plurality of in-vehicle devices 3, a storage portion 11, a situation determining portion 13, an information acquiring portion 15, an information generating portion 17 and an information presenting portion 19. Of these, the storage portion 11, the situation determining portion 13, the information acquiring portion 15, the information generating portion 17 and the information presenting portion 19 constitute the information providing apparatus.

The information providing apparatus is provided in a vehicle, and provides (notifies) information to the driver driving the vehicle. The plurality of in-vehicle devices 3, the storage portion 11, the situation determining portion 13, the information acquiring portion 15, the information generating portion 17 and the information presenting portion 19 are capable of transmitting and receiving various signals through a communication network 5. The communication network 5 is an in-vehicle network connected to each of the plurality of in-vehicle devices 3 and to the information providing apparatus, and communication conforming, for example, to a CAN protocol is performed.

By the performance of communication conforming to the CAN protocol, the signals of the plurality of in-vehicle devices 3 are transferred through the communication network 5.

Here, the plurality of in-vehicle devices 3 each include an in-vehicle function to perform a certain operation. Moreover, of the plurality of in-vehicle devices 3, in-vehicle devices 3 of specific groups include in-vehicle functions related to specific matters.

Specifically, the vehicle is provided with a steering system ECU, a body system ECU, a safety system ECU and the like. For example, the steering system ECU controls steering, that is, a device related to steerage, and controls an electric steering device and the like. Therefore, in the case of, of the plurality of in-vehicle devices 3, devices related to steering, a control device such as the steering system ECU and a driving device such as the electric steering device are the corresponding in-vehicle devices 3.

Moreover, the body system ECU controls devices related to the body, that is, the vehicle body, and controls the power window, the power seat, the instrument panel, the light and the like. Therefore, in the case of, of the plurality of in-vehicle devices 3, devices related to the vehicle body, a control device such as the body system ECU, driving devices such as the power window and the power sheet, a display device such as the instrument panel and a lighting device such as the light are the corresponding in-vehicle devices 3.

Moreover, the safety system ECU controls devices that protect passengers on the vehicle including the driver, and controls the parking assist, the air bag, the seat belt, the back guide monitor and the like. Therefore, in the case of, of the plurality of in-vehicle devices 3, devices related to the protection of the passengers on the vehicle, a control device such as the safety system ECU, an integrated system such as the parking assist, protective equipment such as the air bag and the seat belt and the parking assist device such as the back guide monitor are the corresponding in-vehicle devices 3.

In the storage portion 11, a signal change pattern based on the condition of each of the plurality of in-vehicle devices 3 is stored in associated state for each previously conceived situation around the vehicle. Specifically, in the storage portion 11, change patterns of the signals of the in-vehicle devices 3 generated based on general drivers' operation patterns or the like are stored for each situation around the vehicle. The storage portion 11 stores such signal change patterns for each situation around the vehicle as a behavior model database.

Moreover, it is assumed that more than one situation around the vehicle is stored in the storage portion 11. The situations around the vehicle include mainly situations related to the external environment of the vehicle and situations related to operations of the vehicle. A situation related to the external environment of the vehicle is, for example, rainy weather. Moreover, a situation related to operations of the vehicle is, for example, the parking operation.

While the storage portion 11 may be formed of a semiconductor memory, it may be formed of an HDD. Moreover, the storage portion 11 may be incorporated in the information providing apparatus, or may be detachably insertable in the information providing apparatus.

The situation determining portion 13 presumes the situation around the vehicle based on the signal change of at least one in-vehicle device 3 of the plurality of in-vehicle devices 3 and the signal change pattern stored in the storage portion 11. Specifically, when the signal change of at least one in-vehicle device 3 of the plurality of in-vehicle devices 3 and the signal change pattern coincide with each other, of the previously conceived situations around the vehicle, the situation around the vehicle corresponding to the coinciding signal change pattern is selected as the presumed situation around the vehicle.

The information acquiring portion 15 acquires, through the communication network 5, the information on the condition of, of the plurality of in-vehicle devices 3, the in-vehicle device 3 related to the situation around the vehicle presumed by the situation determining portion 13. Here, the condition of the in-vehicle device 3 related to the situation around the vehicle presumed by the situation determining portion 13 is either recommended condition or non-recommended condition as the condition corresponding to the situation around the vehicle.

The information generating portion 17 generates notification information on the recommended operation recommended to the driver based on the information on the condition of the in-vehicle device 3 related to the situation around the vehicle presumed by the situation determining portion 13 which information is acquired by the information acquiring portion 15. Specifically, the information generating portion 17 generates notification information on the recommended operation when the condition of the in-vehicle device 3 related to the situation around the vehicle presumed by the situation determining portion 13 is non-recommended condition.

The information presenting portion 19 presents to the driver the notification information on the recommended operation generated by the information generating portion 17. When the information presenting portion 19 presents the notification information to the driver, the notifying means is not specifically limited. For example, when the vehicle is provided with a speaker, the information presenting portion 19 may notify the notification information by voice. Moreover, when the vehicle is provided with a display, the information presenting portion 19 may notify the notification information by image. In this case, the image may include character information or in the image, the corresponding part of the vehicle may be highlighted.

Figure 2:
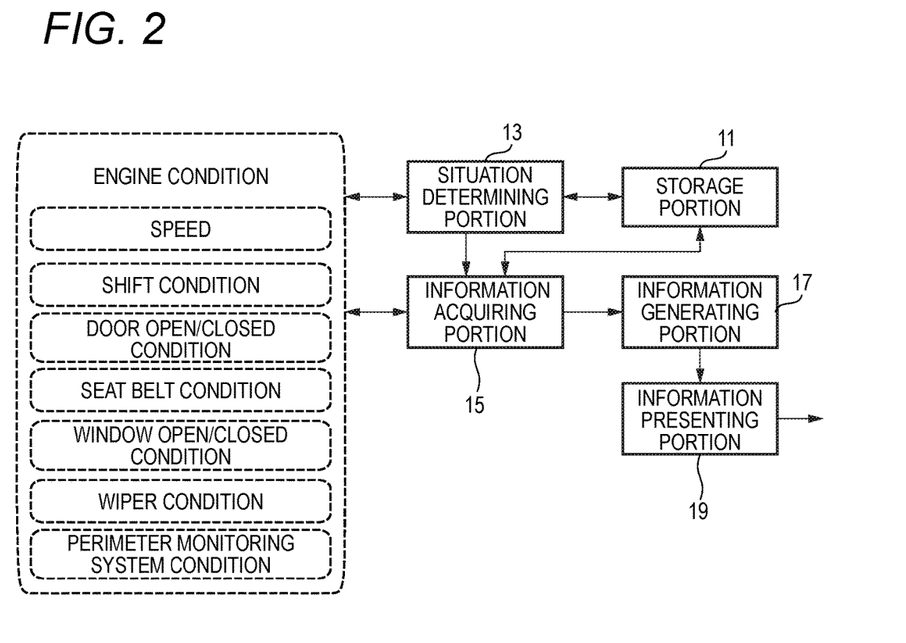
FIG. 2 is a view showing an example of the conditions of in-vehicle devices according to the first embodiment.

Next, the contents included in the signals transferred through the communication network 5 will be described by using FIG. 2. FIG. 2 is a view showing an example of the conditions of the in-vehicle devices 3 according to the first embodiment. As shown in FIG. 2, as the conditions of the in-vehicle devices 3, the engine condition, the speed, the shift condition, the door open/closed condition, the seat belt condition, the window open/closed condition, the wiper condition, the perimeter monitoring system condition and the like are presumed. Information on such conditions of the in-vehicle devices 3 can be obtained through the communication network 5.

The engine condition includes, for example, information related to the vehicle stopped condition, startup condition, normal driving condition and the like of the engine. The speed includes information related to the speed of the vehicle. The shift condition includes information related to the position of the shift lever, and in the case of an AT vehicle, is information indicating which of the P range, the R range, the N range, the D range and the like the range is, the time for which the range is held, the shift order of the shift change to each range and the like.

The door open/closed condition includes information related to whether the door is open or not. The seat belt condition includes information related to whether the seat belt is fastened or not. The window open/closed condition includes information related to whether the window is open or not. The wiper condition includes information related to the duration time of the wiper operation, the frequency of the wiper operation and the like. The perimeter monitoring system condition includes information related to whether the perimeter monitoring system is running or not. Here, the perimeter monitoring system reduces the driver's blind spot, for example, by providing the driver with information taken by a non-illustrated in-vehicle camera.

Figure 3:
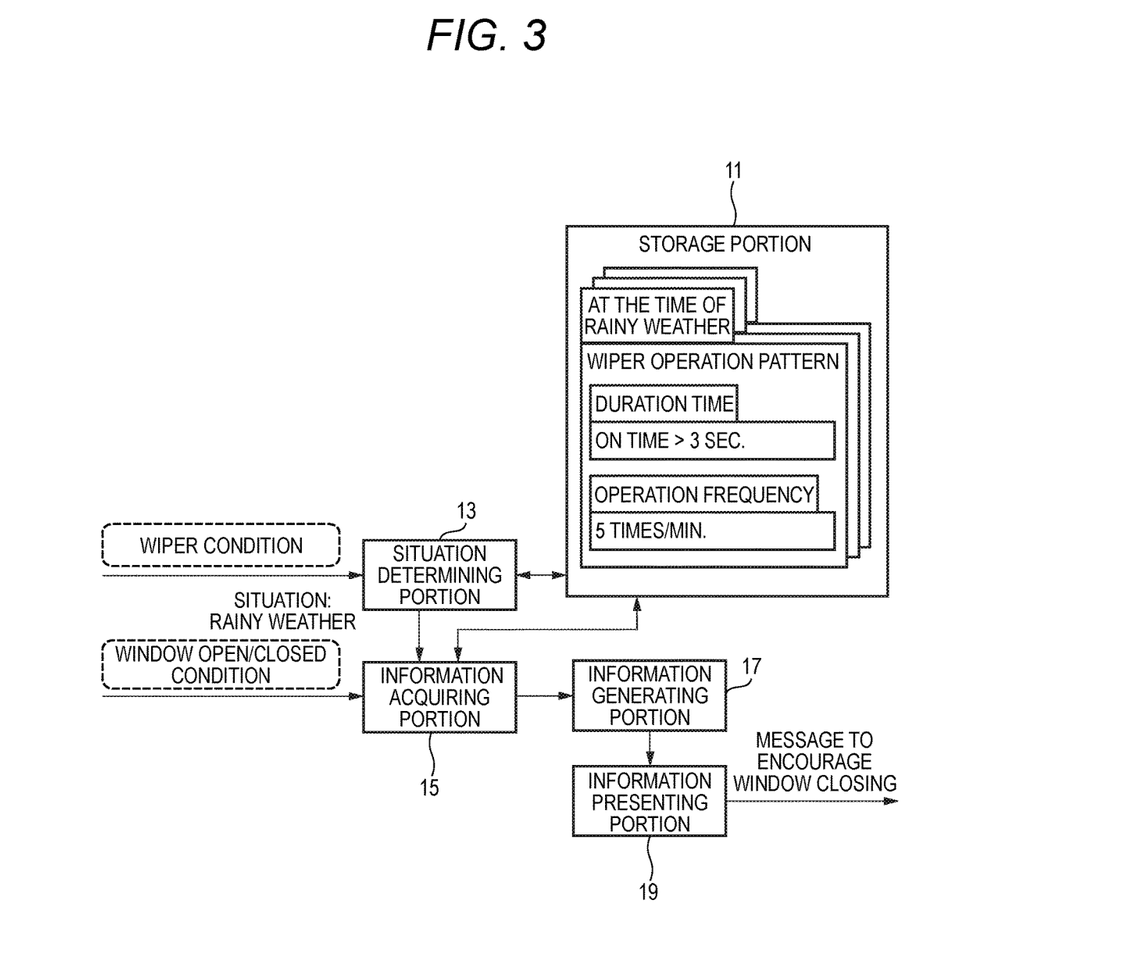
FIG. 3 is a view showing an example of the signal change pattern according to the first embodiment.

Next, a case where the situation around the vehicle is rainy weather will be described by using FIG. 3. FIG. 3 is a view showing an example of the signal change patterns according to the first embodiment. As a precondition for the operation of the example of FIG. 3, in the storage portion 11, a change pattern of the signal indicating the wiper condition, that is, a wiper operation pattern is associated with rainy weather as a situation around the vehicle. Moreover, in the storage portion 11, the wiper condition and the window condition are associated with rainy weather as a situation around the vehicle.

As shown in FIG. 3, to the situation determining portion 13, information on the wiper condition is inputted. The situation determining portion 13 determines whether or not the change of the signal based on the inputted information on the wiper condition coincides with the wiper operation pattern at the time of rainy weather existing in the storage portion 11.

Specifically, the situation determining portion 13 determines whether the wiper ON time is not less than three seconds or not. Further, the situation determining portion 13 determines whether the number of times the wiper is turned on is not less than five times per minute or not. When the signal change coincides with the wiper operation pattern at the time of rainy weather existing in the storage portion 11 as a result of these determinations, the situation determining portion 13 presumes the situation around the vehicle to be rainy weather.

The reason why it is determined whether the wiper ON time is not less than three seconds or not is in order to make a distinction from the time of use of the wiper or the like. Moreover, the reason why it is determined whether the number of times the wiper is turned on is not less than five times per minute or not is in order to, since some users frequently perform the wiper operation by hand, make a distinction from such an operation.

The information acquiring portion 15 acquires through the communication network 5 a signal indicating the condition of the window as the condition of the in-vehicle device 3 related to the situation around the vehicle, that is, the situation of rainy weather. In this case, the information acquiring portion 15 acquires the window open/closed condition.

The information generating portion 17 generates notification information on the recommended operation recommended to the window based on the window open/closed condition. Specifically, when the situation around the vehicle is rainy weather and the window open/closed condition is the open condition, the information generating portion 17 generates a message to encourage window closing. The information presenting portion 19 presents to the driver the message to encourage window closing generated by the information generating portion 17. On the other hand, when the situation around the vehicle is rainy weather and the window open/closed condition is the closed condition, the information generating portion 17 may generate a message to continue the window closed condition with no change.

When the situation around the vehicle is rainy weather, the recommended condition of the window is a condition where the window is closed, and the non-recommended condition of the window is a condition where the window is open.

Figure 4:
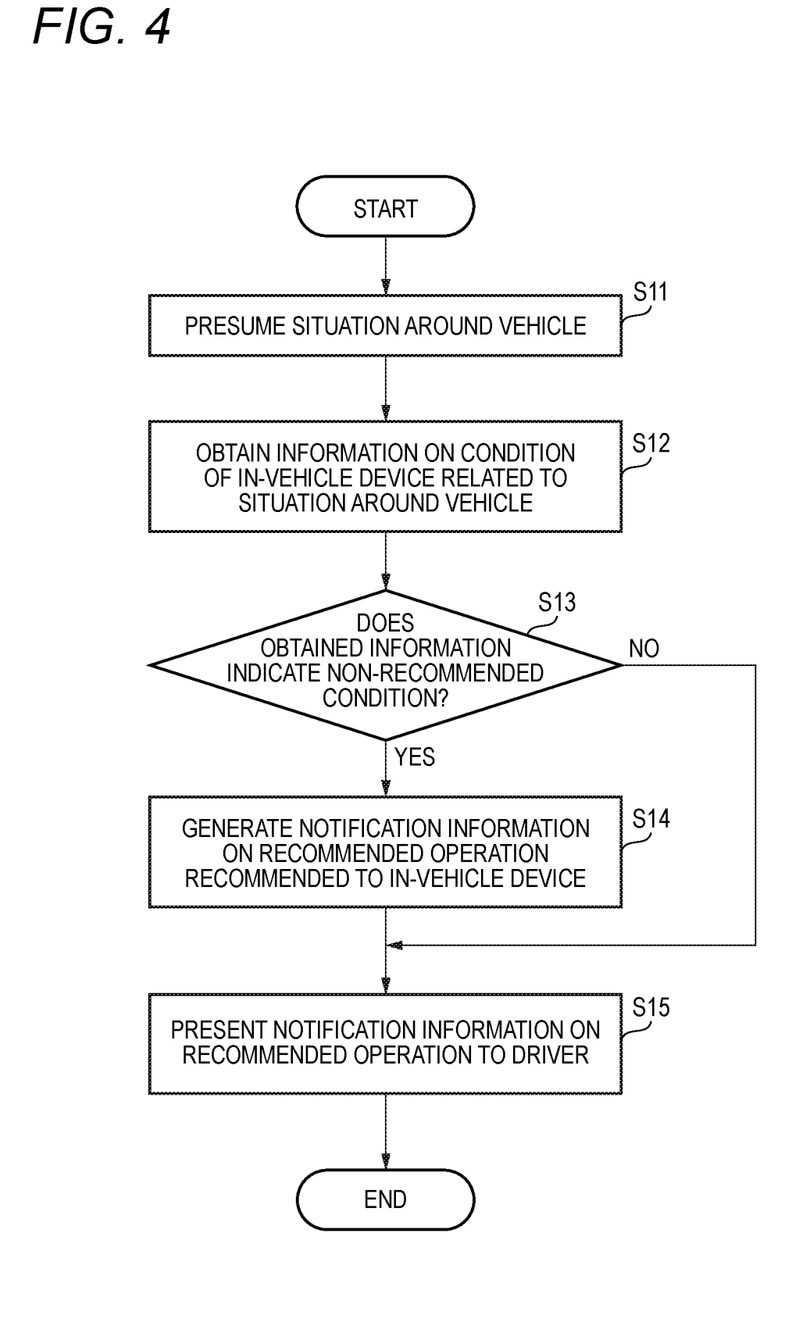
FIG. 4 is a flowchart explaining a control example of the information providing apparatus according to the first embodiment.

Next, the operation of the information providing apparatus will be described by using FIG. 4. FIG. 4 is a flowchart explaining a control example of the information providing apparatus according to the first embodiment.

At the situation determining portion 13, the situation around the vehicle is presumed based on the signal change of at least one in-vehicle device 3 of the plurality of in-vehicle devices 3 and the signal change pattern stored in the storage portion 11 (step S11). Then, at the information acquiring portion 15, information on the condition of the in-vehicle device 3 related to the situation around the vehicle is obtained (step S12). Then, at the information generating portion 17, it is determined whether the acquired information indicates the non-recommended condition or not (step S13). When the acquired information indicates the non-recommended condition (YES at step S13), at the information generating portion 17, notification information on the recommended operation recommended to the in-vehicle device 3 is generated (step S14), and at the information presenting portion 19, the notification information on the recommended operation is presented to the driver (step S15). On the other hand, when the acquired information does not indicate the non-recommended condition, that is, when the acquired information is the recommended condition (NO at step S13), the notification information on the recommended operation is presented to the driver. When the acquired information does not indicate the non-recommended condition, that is, the acquired information is the recommended condition, it may be performed to provide no notification to the driver. In this case, the process ends without proceeding to step S15 subsequently to NO at step S13.

From the above description, according to the information providing apparatus according to the first embodiment, when the situation around the vehicle is rainy weather, the recommended operation of, of the plurality of in-vehicle devices 3, the in-vehicle device 3 related to the time of rainy weather can be presented. Thereby, the information providing apparatus can reduce the driver's careless mistake, so that forgetting to use the function of the in-vehicle device 3 related to the time of rainy weather can be prevented. Moreover, since the information providing apparatus does not require a detection result of a sensor that detects the time of rainy weather such as a raindrop sensor, the time of rainy weather can be presumed at low cost.

(Second Embodiment)

In a second embodiment, since the functions of the storage portion 11, the situation determining portion 13, the information acquiring portion 15, the information generating portion 17, the information presenting portion 19 and the communication network 5 are similar to those of the first embodiment, descriptions thereof are omitted. What the second embodiment is different from the first embodiment is that the situation around the vehicle is the driving operation. Therefore, the case where the situation around the vehicle is the driving operation will be described by using FIG. 5.

Figure 5:
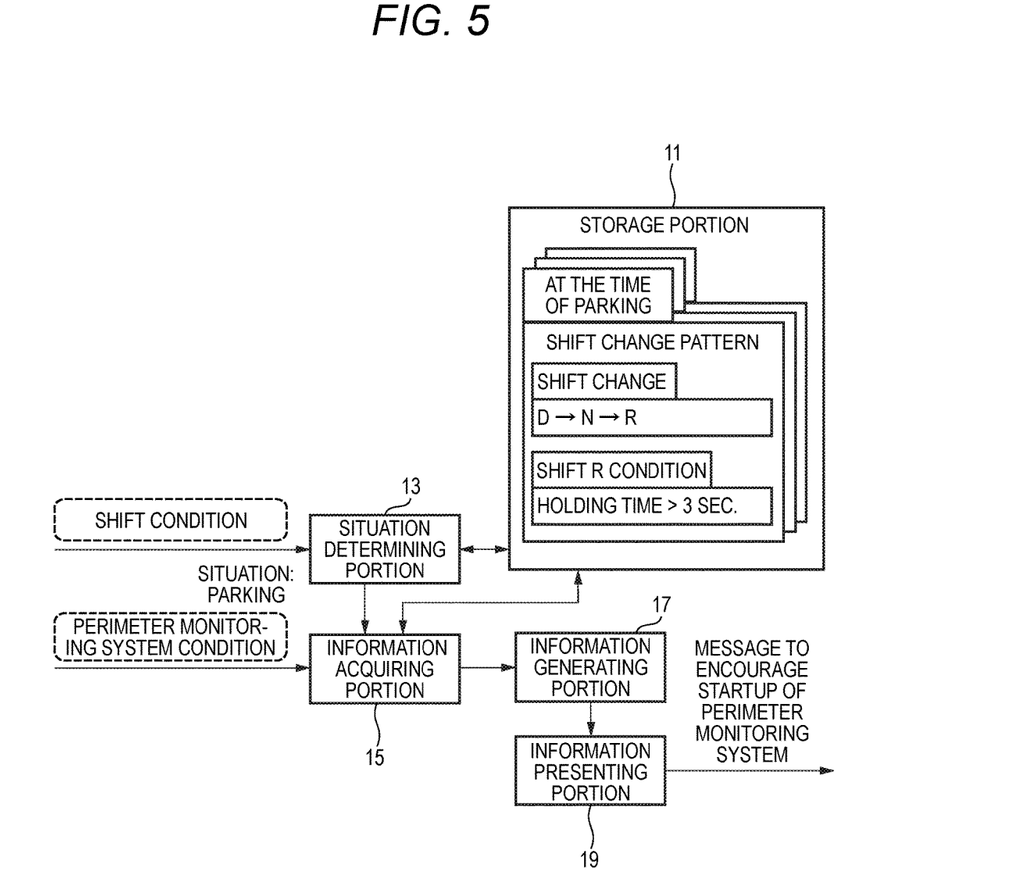
FIG. 5 is a view showing an example of the signal change pattern according to a second embodiment.

FIG. 5 is a view showing an example of the signal change pattern according to the second embodiment. As a precondition for the operation of the example of FIG. 5, in the storage portion 11, change patterns of the signal indicating the shift lever condition, that is, shift change patterns are associated with the parking operation as a situation around the vehicle. Moreover, in the storage portion 11, the condition of the shift lever and the perimeter monitoring system condition are associated with the parking operation as a situation around the vehicle.

As shown in FIG. 5, to the situation determining portion 13, information on the condition of the shift lever, that is, information on the shift condition is inputted. The situation determining portion 13 determines whether or not the signal change based on the inputted information on the shift condition coincides with the shift change pattern at the time of parking existing in the storage portion 11.

Specifically, the situation determining portion 13 determines whether the condition where the shift lever is in the R range is held for not less than three seconds or not. Further, the situation determining portion 13 determines whether the change pattern of the shift lever is changed in the order of the D range, the N range and the R range or not. When the signal change coincides with the shift change pattern at the time of parking existing in the storage portion 11 as a result of these determinations, the situation determining portion 13 determines that the situation around the vehicle is parking.

Whether the condition where the shift lever is in the R range is held for not less than three seconds or not is determined in order to distinguish whether the condition is such that the input of the R range between the P range and the D range is canceled or not. Moreover, whether the change pattern of the shift lever is changed in the order of the D range, the N range and the R range or not is determined in order to, since the operation from the P range to the R range at the time of parking is very rare, make a distinction from such an operation.

The information acquiring portion 15 acquires through the communication network 5 a signal indicating the situation around the vehicle, that is, information on the condition of the in-vehicle device 3 related to parking, specifically, the perimeter monitoring system condition. In this case, the information acquiring portion 15 acquires the perimeter monitoring system condition.

The information generating portion 17 generates notification information on the recommended operation recommended to the perimeter monitoring system based on the perimeter monitoring system condition. Specifically, when the situation around the vehicle is parking and the perimeter monitoring system condition is off, the information generating portion 17 generates a message to encourage system startup. The information presenting portion 19 presents to the driver the message to encourage system startup generated by the information generating portion 17. On the other hand, when the situation around the vehicle is parking and the perimeter monitoring system condition is on, the information generating portion 17 may generate a message to maintain system startup.

From the above description, according to the information providing apparatus according to the second embodiment, when the situation around the vehicle is parking, the recommended operation of, of the plurality of in-vehicle devices 3, the in-vehicle device 3 related to the time of parking can be presented. Thereby, the information providing apparatus can perform assist of the driver's operation, so that forgetting to use the function of the in-vehicle device 3 related to the time of parking can be prevented.

In this way, according to the information providing apparatus according to the first and second embodiments, the plurality of in-vehicle devices 3 are grouped based on the situations around the vehicle. That is, the information providing apparatus selects the in-vehicle device 3 to perform the operation corresponding to the situation around the vehicle, and performs notification considering the overall operation of the selected in-vehicle device 3.

In other words, since the condition of each of the plurality of in-vehicle devices 3 is associated with a situation around the vehicle, the information providing apparatus can presume the driver's current condition in the vehicle based on the situation around the vehicle and the condition of the in-vehicle device 3 and present the information suitable for the result of the presumption to the driver, so that the information on the recommended operation suitable for the situation around the vehicle can be presented to the driver.

By doing this, the information providing apparatus can provide necessary information to the driver according to the situation. This enables the information providing apparatus to make the driver avoid the situation presumed to occur because the driver does not know the necessary information. Therefore, the information providing apparatus can present information so that the driver does not suffer from disadvantages.

Moreover, the condition of the in-vehicle device 3 related to the situation around the vehicle presumed by the situation determining portion 13 is, as the condition corresponding to the situation around the vehicle, either the recommended condition recommended to the in-vehicle device 3 or the non-recommended condition not recommended to the in-vehicle device 3. Therefore, the information providing apparatus can presume which of the recommended condition and the non-recommended condition the condition of the in-vehicle device 3 is with respect to the situation around the vehicle, so that notification information can be generated according to the situation around the vehicle.

By doing this, the information providing apparatus can generate appropriate notification information according to the situation, so that information suitable for the situation can be presented to the driver.

Moreover, the information providing apparatus determines whether the signal change of at least one in-vehicle device 3 of the plurality of in-vehicle devices 3 and the signal change pattern coincide with each other or not. Here, the change pattern of the signal indicating the condition of the in-vehicle device 3 is associated with each situation around the vehicle. Therefore, the information providing apparatus can associate the change of the signal indicating the condition of the in-vehicle device 3, the change pattern of the signal indicating the condition of the in-vehicle device 3 and the situation around the vehicle with one another, so that the in-vehicle device 3 related to the situation around the vehicle can be searched for with reference to the situation around the vehicle.

By doing this, the information providing apparatus can determine the condition of the in-vehicle device 3 based on the change pattern of the signal indicating the condition of the in-vehicle device 3, so that it is unnecessary to provide a dedicated sensor for each of the plurality of in-vehicle devices 3. That is, the information providing apparatus can determine the condition of the in-vehicle device 3 without the provision of dedicated sensors. Consequently, the information providing apparatus can be realized at low cost.

From the above description, according to the information providing apparatus according to the first and second embodiments, the information providing apparatus is an information providing apparatus provided in a vehicle and providing notification to a driver driving the vehicle, and is provided with: the communication network 5 connected to each of the plurality of in-vehicle devices 3; the storage portion 11 in which the signal change pattern based on the condition of each of the plurality of in-vehicle devices 3 is stored in associated state for each previously conceived situation around the vehicle; the situation determining portion 13 that presumes the situation around the vehicle based on the signal change of at least one in-vehicle device 3 of the plurality of in-vehicle devices 3 and the signal change pattern stored in the storage portion 11; the information acquiring portion 15 that acquires, through the communication network 5, information on the condition of, of the plurality of in-vehicle devices 3, the in-vehicle device 3 related to the situation around the vehicle presumed by the situation determining portion 13; the information generating portion 17 that generates the notification information on the recommended operation recommended to the driver based on the information on the condition of the related in-vehicle device acquired by the information acquiring portion 15; and the information presenting portion 19 that presents to the driver the notification information on the recommended operation generated by the information generating portion 17.

Therefore, the information providing apparatus generates information on the recommended operation based on the situation around the vehicle and the condition of the in-vehicle device 3, so that the information on the recommended operation suitable for the situation around the vehicle can be presented to the driver of the vehicle.

Moreover, in the information providing apparatus according to the first and second embodiments, the condition of the related in-vehicle device 3 is either the recommended condition or the non-recommended condition as the condition corresponding to the situation around the vehicle, and when the condition of the related in-vehicle device 3 is the non-recommended condition, the information generating portion 17 generates the notification information on the recommended operation.

Therefore, the information providing apparatus can determine which of the recommended condition and the non-recommended condition the condition of the in-vehicle device 3 corresponding to the situation around the vehicle is, so that notification information suitable for the situation around the vehicle can be generated.

Moreover, in the information providing apparatus according to the first and second embodiments, when the signal change of at least one in-vehicle device 3 of the plurality of in-vehicle devices 3 and the signal change pattern coincide with each other, the situation determining portion 13 selects, of the previously conceived situations around the vehicle, the situation around the vehicle corresponding to the coinciding signal change pattern as the presumed situation around the vehicle.

Therefore, the information providing apparatus can associate the signal change of the in-vehicle device 3, the signal change pattern of the in-vehicle device 3 and the situation around the vehicle with one another, so that the driver's current condition in the vehicle can be presumed.

While the present invention is described above based on the first and second embodiments, the present invention is not limited to the above-described first and second embodiments, and may be modified without departing from the gist of the present invention.

For example, while a case where the situation around the vehicle is either rainy weather or parking is described in the first and second embodiments, the present invention is not limited thereto; the situation around the vehicle may be the time of vehicle startup. In this case, for example, if the condition of an in-vehicle device 3 is related to the engine condition and the condition of another in-vehicle device 3 is related to the seat belt condition, based on the engine condition, the information providing apparatus can determine that the situation around the vehicle is the time of vehicle startup and determine the seat belt condition as the condition related to the time of vehicle startup. In this case, if the seat belt condition is the non-fastened condition, the information providing apparatus provides a notification that the seat belt should be fastened as the recommended operation.

Moreover, while a case where the situation around the vehicle is either rainy weather or parking is described in the first and second embodiments, the present invention is not limited thereto; the situation around the vehicle may be the time when the vehicle is stopped. In this case, for example, if the condition of an in-vehicle device 3 is related to the engine condition and the condition of another in-vehicle device 3 is related to the door open/closed condition, based on the engine condition, the information providing apparatus can determine that the situation around the vehicle is the vehicle stopped time and determine the door open/closed condition as the condition related to the vehicle stopped condition. In this case, if the door open/closed condition is the open condition, the information providing apparatus provides a notification that the door should be closed as the recommended operation.

Moreover, while an operation with an AT vehicle as the premise is described in the second embodiment, the present invention is not limited thereto; the vehicle may be an MT vehicle. In this case, shift change patterns of the MT vehicle are stored in the storage portion 11 and a determination based on the shift lever operation conforming to the MT vehicle is performed.

While an example in which the determination of the condition of one in-vehicle device 3 is made based on only one condition is described in the first and second embodiments, the present invention is not limited thereto; the condition of one in-vehicle device 3 may be determined based on a plurality of conditions.

(Third Embodiment)

Figure 6:
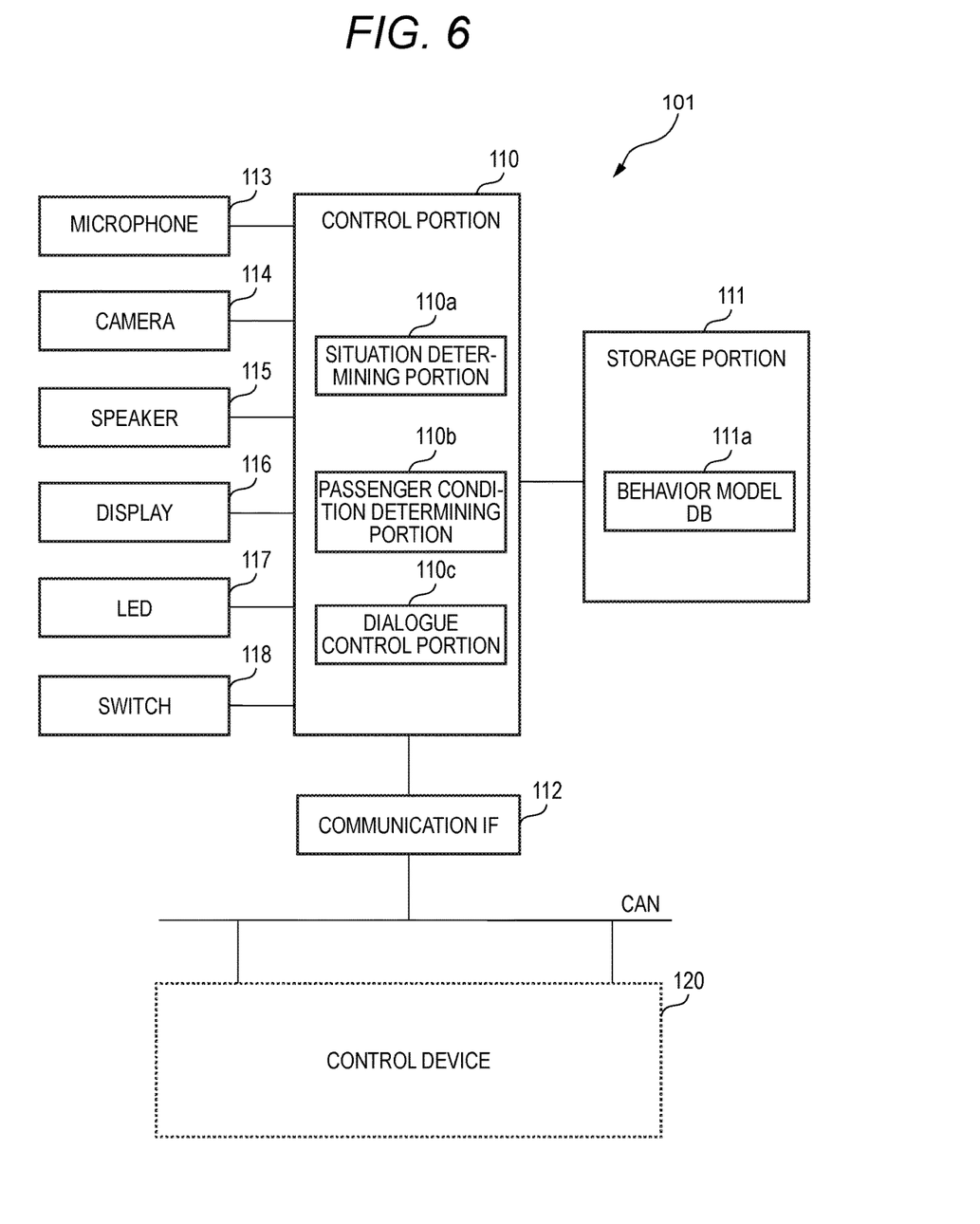
FIG. 6 is a block diagram showing the structure of an information providing apparatus for a vehicle according to a third embodiment.

FIG. 6 is a block diagram showing the structure of an information providing apparatus 101 for a vehicle according to a third embodiment. The information providing apparatus 101 for a vehicle according to the present embodiment is an apparatus that provides information to the passengers (typically, the driver) of the vehicle and provides predetermined services.

The information providing apparatus 101 for a vehicle is mainly provided with a control portion 110, a storage portion 111, a communication IF 112, a microphone 113, a camera 114, a speaker 115, a display 116, an LED 117 and a switch 118.

The control portion 110 controls the entire information providing apparatus 101 for a vehicle, and a microcomputer formed mainly of a CPU, a ROM, a RAM and an I/O interface may be used. The CPU performs various controls according to a control program. The ROM stores programs that the CPU executes or data necessary for executing the programs. The RAM is the work area when the CPU executes the programs.

The storage portion 111 is formed of a storage device such as a hard disk device, and in the storage portion 111, a behavior model database 111a is stored. Moreover, in the storage portion 111, various kinds of data necessary for the information providing apparatus 101 for a vehicle to provide information are stored.

The behavior model database 111a is a database where later-described vehicle signal patterns and traveling situations are associated with each other, and vehicle signal patterns corresponding to various traveling situations are stored. The behavior model database 111a is created by statistically processing vehicle signal patterns corresponding to patterns of driving operations performed by typical drivers for each of the various traveling situations, and is previously created through tests and simulations. In other words, the behavior model database 111a corresponds to behavior models obtained by previously modeling vehicle signal patterns for each traveling situation.

The communication IF 112 is an interface for performing communication between the control portion 110 and various control devices (ECUs: Electric Control Units) 120 and the like on the vehicle side, and conforms, for example, to the CAN (Control Area Network) standard. Through the communication IF 112, vehicle signals related to the vehicle conditions transmitted and received in the vehicle such as the traveling speed, the steering angle, the brake and the blinker are inputted to the control portion 110 from the vehicle side. Moreover, through the communication IF 112, a vehicle signal related to the vehicle position possessed by the navigation ECU (for example, information on expressways and general roads and information on the up lane and the down lane) are inputted to the control portion 110 from the vehicle side.

The microphone 113 is disposed in the vicinity of the driver's seat, and the voice uttered by the driver is inputted thereto. The voice inputted to the microphone 113 is outputted as a voice signal and inputted to the control portion 110.

The camera 114 is disposed in front of the driver's seat (for example, the instrument panel), takes an image of a predetermined area including the driver's face, and outputs the taken image. The image outputted from the camera 114 undergoes A/D conversion and image processing, and is inputted to the control portion 110 as image data.

The speaker 115 is controlled by the control portion 110, and outputs predetermined voice messages and sounds.

Figure 7:
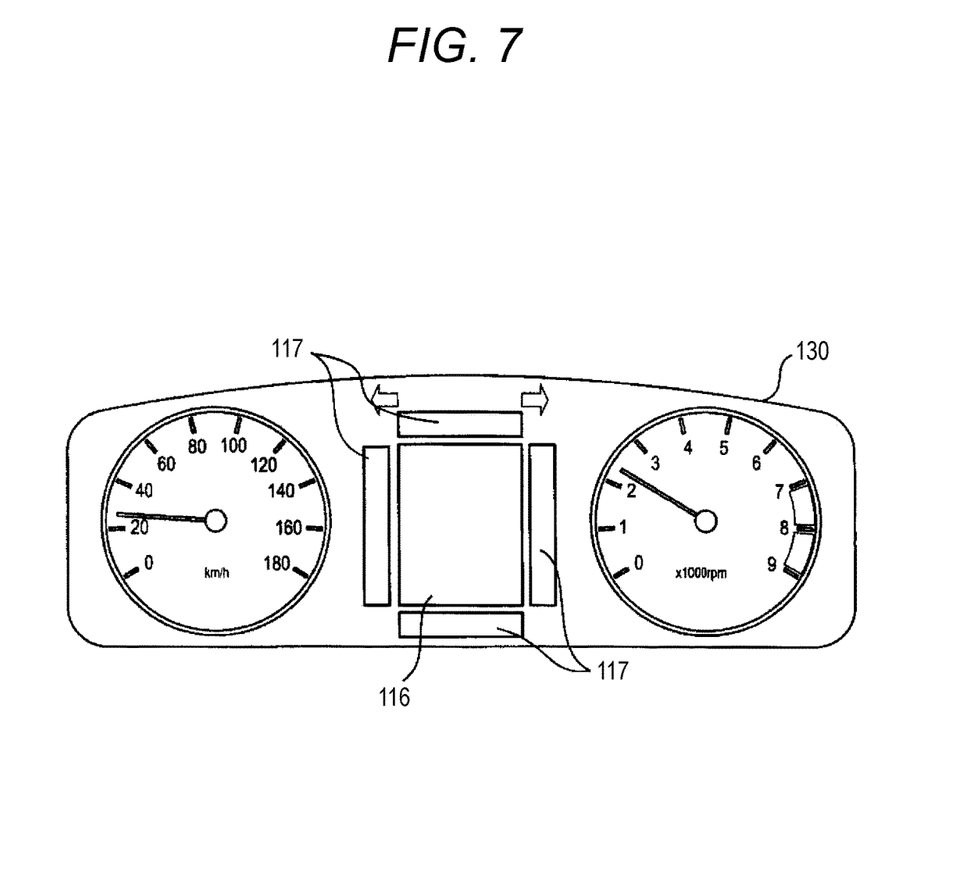
FIG. 7 is an explanatory view showing a meter unit.

The display 116 is a display device controlled by the control portion 110 and displaying images, texts and graphics corresponding to predetermined information. As the display 116, for example, an LCD or a TFT may be used. In the present embodiment, as shown in FIG. 7, the display 116 is realized by a display for a meter disposed together with various measuring instruments in a meter unit 130.

The LED 117 is display means controlled by the control portion 110 and performing the turning on and off of the light. As shown in FIG. 7, the LED 117 is disposed more than one in number around the display 116.

The switch 118 is for inputting an operation signal responsive to the driver's operation to the control portion 110 and is formed, for example, of a steering switch provided on the steering handle.

In the present embodiment, the microphone 113, the camera 114, the speaker 115, the display 116, the LED 117 and the switch 118 correspond to a device that performs communication between the driver and the control portion 110 (communication device). That is, by using the microphone 113, the camera 114 and the switch 118, the driver's condition can be grasped, and by using the speaker 115, the display 116 and the LED 117, information can be sent to the driver.

As a feature of the present embodiment, the control portion 110 performs the function of providing information to the driver, and when a scene requiring information provision is determined in response to the driver's request or irrespective of the driver's request, information can be provided to the driver. For the information provision to the driver, the scene is determined by the control portion 110, and the information is created. Methods of information provision to the driver include output of a voice message using the speaker 115 and display output using the display 116.

When this is interpreted functionally, the control portion 110 has a situation determining portion 110a, a passenger condition determining portion 110b and a dialogue control portion 110c.

The situation determining portion 110a determines the current traveling situation based on the vehicle signal obtained through the communication IF 112 and the behavior model database 111a. The current traveling situation determined by the situation determining portion 110a is outputted to the passenger condition determining portion 110b.

The passenger condition determining portion 110b performs guiding control promoting the driver's awareness by working on the driver's senses (the visual sense, the auditory sense). In other words, this guiding control corresponds to control to, for the information provision automatically performed by the information providing apparatus 101 for a vehicle, promote the readiness to receive this. The passenger condition determining portion 110b performs the guiding control by outputting a voice message or a sound from the speaker 115 or turning on the LED 117.

Then, the passenger condition determining portion 110b determines the driver's condition (reaction) in response to this guiding control. The driver's condition is determined by recognition of the driver's voice, recognition of the driver's visual line or the like.

(Voice Recognition)

The passenger condition determining portion 110b processes the voice signal inputted from the microphone 113 and recognizes the voice uttered by the driver. Then, the passenger condition determining portion 110b determines the driver's condition based on the recognized voice. For example, when the driver utters no voice even though the guiding control is performed, it is determined that the driver is making no response to the guiding control. On the other hand, when the driver utters a certain voice in response to the guiding control, it is determined that the driver responded to the guiding control.

(Visual Line Recognition)

The passenger condition determining portion 110b processes the image data inputted from the camera 114 and recognizes the direction of the driver's visual line. Then, the passenger condition determining portion 110b determines the driver's condition based on the recognized direction of the visual line. For example, when the driver remains looking at the outside of the vehicle even though the guiding control is performed, it is determined that the driver is making no response to the guiding control. On the other hand, when the driver turns his/her eyes to the inside of the vehicle (for example, the meter unit 130 or the speaker 115) in response to the guiding control, it is determined that the driver responded to the guiding control.

The driver's condition may be determined by an input operation on the switch 118. For example, when the driver does not operate the switch 118 even though the guiding control is performed, it is determined that the driver is making no response to the guiding control. On the other hand, when the driver operated the switch 118 in response to the guiding control, it is determined that the driver responded to the guiding control.

The dialogue control portion 110c provides information to the driver based on the current traveling situation determined by the situation determining portion 110a and the driver's condition determined by the passenger condition determining portion 110b. Specifically, the dialogue control portion 110c determines the scene where information should be provided from the current traveling situation, and determines whether the driver is ready to receive information or not from the driver's condition. Thereby, the dialogue control portion 110c can provide information to the driver in the scene where the information should be provided and when the driver becomes ready to receive the information.

Moreover, the dialogue control portion 110c confirms the driver's intention based on the driver's response to the information provided to the driver. Then, the dialogue control portion 110c outputs an operation command to operate the control device 120 (function mounted on the vehicle) based on the confirmed intention.

Figure 8:
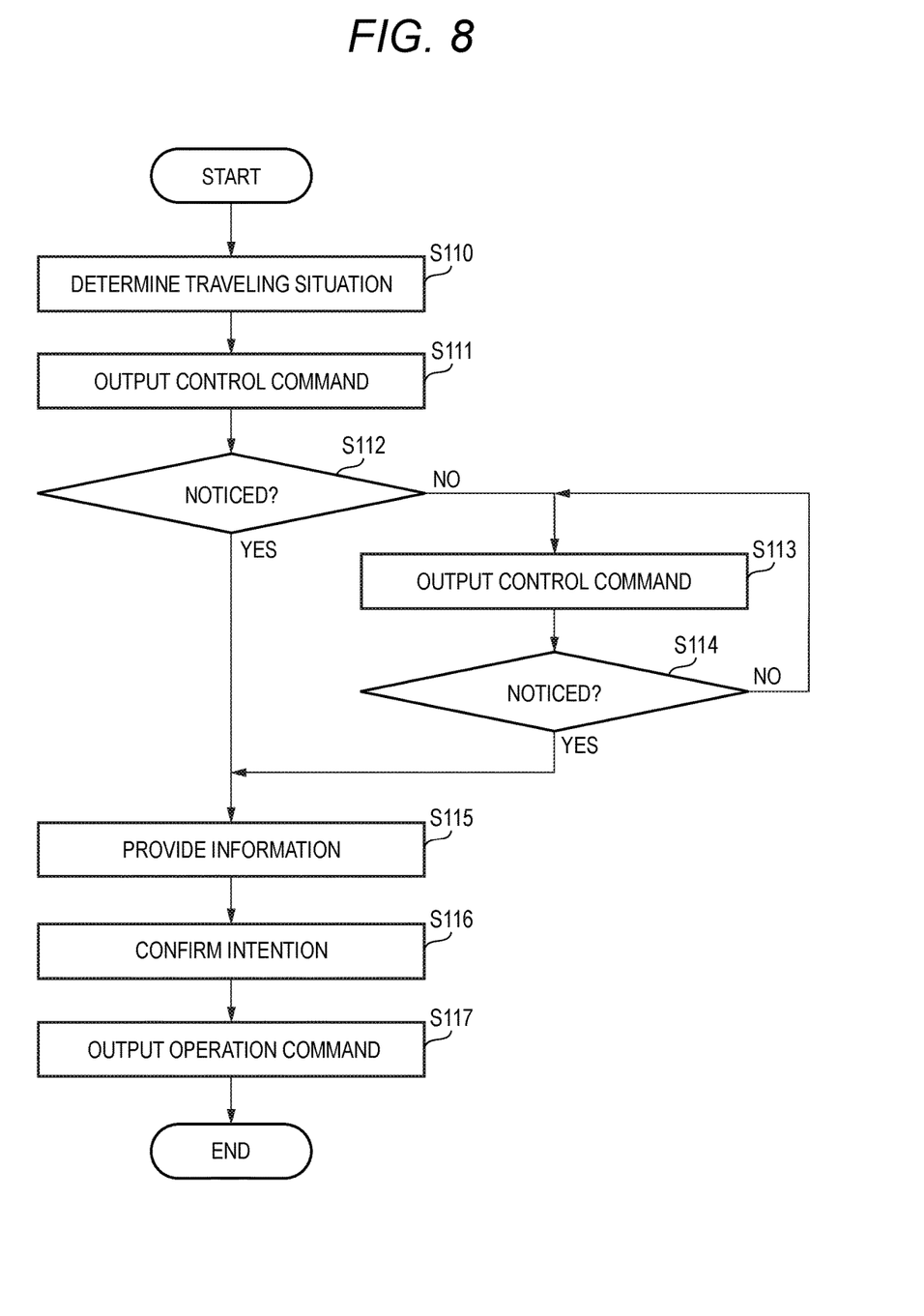
FIG. 8 is a flowchart showing the operation procedure of the information providing apparatus for a vehicle of the third embodiment.

Hereinafter, the information providing operation by the information providing apparatus 101 for a vehicle according to the present embodiment will be described. Here, FIG. 8 is a flowchart showing the operation procedure of the information providing apparatus 101 for a vehicle of the present embodiment. Moreover, FIG. 9 is a block diagram conceptually showing the operation of the information providing apparatus 101 for a vehicle.

Figure 9:
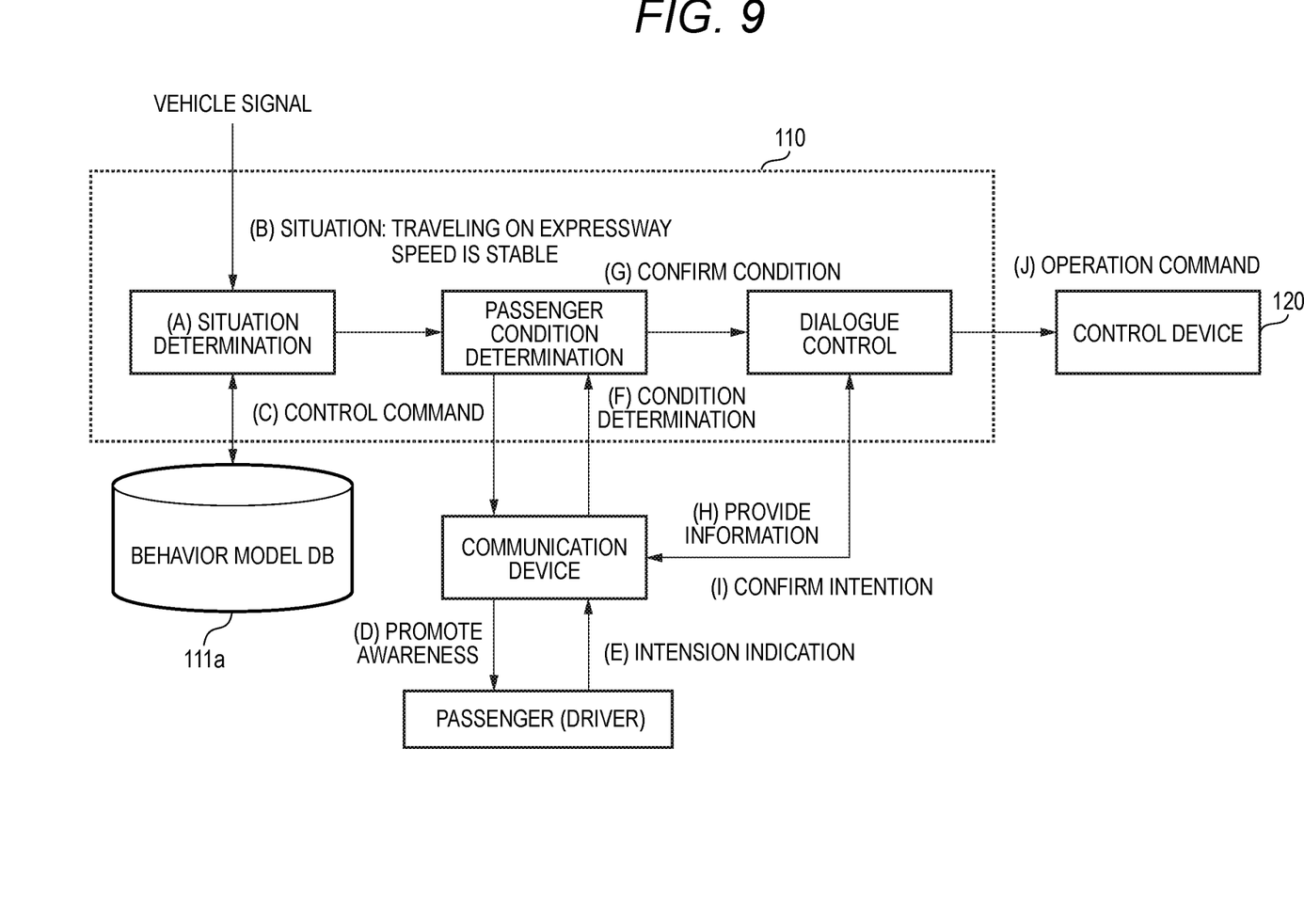
FIG. 9 is a block diagram schematically showing the operation of the information providing apparatus for a vehicle.

First, at step S110, the control portion 110 searches the behavior model database 111a based on the pattern of the vehicle signal obtained through the communication IF 112, and determines the current traveling situation (the processing (A) of FIG. 9). For example, it is determined that the current traveling situation is that "the vehicle is traveling on an expressway and the speed is stable" based on the pattern of the vehicle signal related to the speed (for example, 97 km/h for five minutes) and the pattern of the vehicle signal related to the vehicle position (for example, the up lane of the expressway) (the processing result (B) of FIG. 9).

When the traveling situation is determined at step S110, at step S111, the control portion 110 outputs a control command to the speaker 115 or the LED 117 (the processing (C) of FIG. 9). Accompanying this control command, a sound (including a voice message) is outputted from the speaker 115, the LED 117 is turned on, or both of these are performed (guiding control). By working on the driver's auditory and visual senses by using sound or light, prior to information provision, the driver's awareness, that is, the driver's readiness to receive information can be promoted (the processing (D) of FIG. 9). At this stage, since the promotion of the driver's awareness is the purpose, it is preferable that the sound or the light is of the degree that does not make the driver feel botheration or the like. For example, the sound or the light at the time of the guiding control is weaker in quantity than the sound or the light at the time of the information provision.

At step S112, the control portion 110 determines the driver's condition in response to the guiding control, that is, whether the driver has noticed the sound or the light or not. Whether the driver has noticed the sound or the light or not is determined from the intention indication based on the driver's utterance or the driver's visual line (the processing (E) of FIG. 9). The control portion 110 determines whether the driver has noticed the sound or the light or not by processing the voice signal inputted through the microphone 113 and recognizing the driver's voice (the processing (F) of FIG. 9). Alternatively, the control portion 110 determines whether the driver has noticed the sound or the light or not by processing the image outputted from the camera 114 and recognizing that the direction of the driver's visual line becomes a predetermined direction (the processing (F) of FIG. 9). The control portion 110 may determine whether the driver has noticed the sound or the light or not on the condition that an operation input was made on the switch 118.

When the driver has noticed the sound or the light (the processing (G) of FIG. 9), affirmative determination is made at step S112, and the process proceeds to step S115 described later. On the other hand, when the driver has not noticed the sound or the light, negative determination is made at step S112, and the process proceeds to step S113.

At step S113, the control portion 110 again output the control command to the speaker 115 or the LED 117 (the processing (c) of FIG. 9). Accompanying this control command, a sound (including a voice message) is outputted from the speaker 115, the LED 117 is turned on, or both of these are performed (second guiding control). Since this step S113 is second guiding control, it is preferable that the mode of output of the sound or the light is performed by a mode different from that of the guiding control executed at step S112. For example, the sound volume of the speaker 115 is increased, or the LED 117 is blinked.

At step S114, as at S112, the control portion 110 determines whether the driver has noticed the sound or the light or not (the processings (E), (F) of FIG. 9). When the driver has noticed the sound or the light (the processing (G) of FIG. 9), affirmative determination is made at step S114, and the process proceeds to step S115. On the other hand, when the driver has not noticed the sound or the light, negative determination is made at step S114, and the process returns to step S113.

At step S115, since the driver is ready to receive information, the control portion 110 controls the speaker 115 or the display 116 to provide predetermined information. For example, the control portion 110 provides "constant speed traveling" proposing information (the processing (H) of FIG. 9).

At step S116, the control portion 110 receives the driver's response to the provided information, and confirms the driver's intention (the processing (I) of FIG. 9). The confirmation of the driver's intention can be performed by recognizing the driver's utterance, by detecting an input operation on the switch 118, by recognizing the direction of the driver's visual line or the like.

At step S117, when assent (the driver's intention) to the provided information is confirmed, the control portion 110 outputs a predetermined operation command to the control device 120 (the processing (J) of FIG. 9). For example, an operation command to perform constant speed driving is outputted to the control device 120 taking charge of engine control.

As described above, in the present embodiment, the information providing apparatus 101 for a vehicle has: the situation determining portion 110a that determines the current traveling situation based on the vehicle signal transmitted and received in the vehicle and the behavior model (the behavior model database 111a) obtained by previously modeling the pattern of the vehicle signal for each traveling situation; the passenger condition determining portion 110b that performs guiding control promoting the driver's awareness by working on the driver's sense and determines the driver's condition in response to the guiding control; and the dialogue control portion 110c that provides information to the driver based on the current traveling situation determined by the situation determining portion 110a and the driver's condition determined by the passenger condition determining portion 110b.

Here, the dialogue control portion 110c provides information to the driver when it is determined that the driver has become ready (prepared) to receive information in a scene where the information should be provided.

According to this structure, by previously promoting the driver's awareness, the readiness for the driver to receive information can be created. And since information is provided to the driver having become ready therefor, the driver does not feel that it is annoying or meddling, so that information provision easy for the driver to receive can be performed. Moreover, since information provision is performed with the driver's condition being grasped, the load on the driving task can be reduced.

Moreover, by creating the readiness for the driver to receive information, the driver himself/herself behaves so as to obtain information, so that the driver's feeling that information is forced can be suppressed.

Moreover, in the present embodiment, the dialogue control portion 110c determines the driver's intention based on the driver's response to the information provided to the driver and outputs an operation command to operate a function mounted on the vehicle based on the determined driver's intention.

According to this structure, information suitable for the current traveling situation and the driver's condition can be provided. Thereby, the function mounted on the vehicle can be effectively utilized.

Moreover, in the present embodiment, the passenger condition determining portion 110b recognizes at least one of the driver's voice and the direction of the driver's visual line and determines the driver's condition in response to the guiding control based on the result of the recognition.

According to this structure, the driver's condition can be determined by a simple method. For this reason, it is unnecessary to mount an expensive sensor or device in order to determine the condition, so that information provision can be performed without an increase in cost.

The information provided by the information providing apparatus 101 for a vehicle includes information that is high in urgency. Therefore, the control portion 110 may determine whether the provided information is high in urgency or not. In this case, the following may be performed: For information that is high in urgency, the guiding control as described above is not performed and the information is provided at its provision timing; on the other hand, for information that is not high in urgency, the information is provided on condition that the driver has become ready to accept the information as described above.

While the information providing apparatus for a vehicle according to the first to third embodiments of the present invention is described above, the present invention is not limited to the above-described embodiments, but various modifications are possible without departing from the scope of the invention.

What is claimed is:

1. An information providing apparatus for a vehicle comprising:
    a situation determining portion that determines a current traveling situation based on a vehicle signal transmitted and received in the vehicle and a behavior model obtained by previously modeling a pattern of the vehicle signal for each traveling situation;
    a passenger condition determining portion that performs guiding control based on the current traveling situation determined by the situation determining portion, the guiding control promoting a passenger's awareness by providing an output that is detectable by at least one passenger sense and determines a passenger's condition in response to the guiding control;
    a dialogue control portion that provides notification information on a recommended operation of, of a plurality of in-vehicle devices, an in-vehicle device to the passenger based on the current traveling situation determined by the situation determining portion and the passenger's condition determined by the passenger condition determining portion; and
    a control portion that determines whether the notification information is high in urgency or not,
    wherein the guiding control is performed by a sound output from a sound outputting device or a light emitted from a light emitting device;
    wherein when the passenger condition determining portion determines that no passenger detects the guiding control, the passenger condition determining portion performs another guiding control which is different in mode from a previous guiding control; and
    wherein when the control portion determines that the notification information is high in urgency, the dialogue control portion provides the notification information without performing the guiding control.

2. The information providing apparatus according to claim 1, wherein the dialogue control portion provides information to the passenger when it is determined that the passenger has become ready to receive information in a situation where the information should be provided.

3. The information providing apparatus according to claim 1, wherein the dialogue control portion determines a passenger's intention based on the passenger's response to the information provided to the passenger and outputs an operation command to operate a function mounted on the vehicle based on the determined passenger's intention.

4. The information providing apparatus for a vehicle according to claim 1, wherein the passenger condition determining portion recognizes at least one of a passenger's voice and a direction of the passenger's visual line and determines the passenger's condition in response to the guiding control based on a result of the recognition.

5. The information providing apparatus for a vehicle according to claim 1, wherein the another guiding control promotes the passenger's awareness by providing a sound output from the sound outputting device having a volume greater than a volume of the sound in the previous guiding control or by providing a blinking light emitted from the light emitting device.

* * * * *